United States Patent [19]
Irgens-Bergh

[11] 3,907,537
[45] Sept. 23, 1975

[54] APPARATUS FOR PRODUCING GLASS SPHERES

[75] Inventor: Ib von Irgens-Bergh, Copenhagen, Denmark

[73] Assignee: Potters Industries, Inc., Carlstadt, N.J.

[22] Filed: Oct. 30, 1973

[21] Appl. No.: 411,159

[52] U.S. Cl. ........................... 65/142; 65/10; 264/8; 425/8
[51] Int. Cl.² ......................................... C03B 19/10
[58] Field of Search .............. 65/21, 142, 10; 425/8; 264/8

[56] References Cited
UNITED STATES PATENTS

| | | | |
|---|---|---|---|
| 2,255,206 | 9/1941 | Duncan | 65/10 |
| 2,616,124 | 11/1952 | Lyle | 65/21 X |
| 3,266,085 | 8/1966 | Nacke | 425/8 X |
| 3,597,176 | 8/1971 | Plumat | 65/142 X |

*Primary Examiner*—Robert L. Lindsay, Jr.
*Attorney, Agent, or Firm*—Lee C. Robinson, Jr.

[57] ABSTRACT

An apparatus for producing glass beads or other spherical particles which includes an open-top rotary receptacle for receiving a free falling molten stream. The receptacle is rotated at a carefully controlled speed to maintain the molten material in continuous contact with the upstanding side wall of the receptacle. A series of capillary orifices extend radially from the side wall in a single plane, and each of these orifices has a cross-sectional area which is substantially equal to that of the spheres to be produced. As the receptacle rotates, the molten material completely covers the entrance openings of the orifices and is discharged therefrom into the atmosphere under ambient temperature conditions to form a multiplicity of dispersed particles. The dispersed particles pass through a space for a period of time sufficient to enable surface tension to shape the particles into spherical form. The particles drop into a series of rotatable concentric bins where they are collected for packaging and shipping.

2 Claims, 11 Drawing Figures

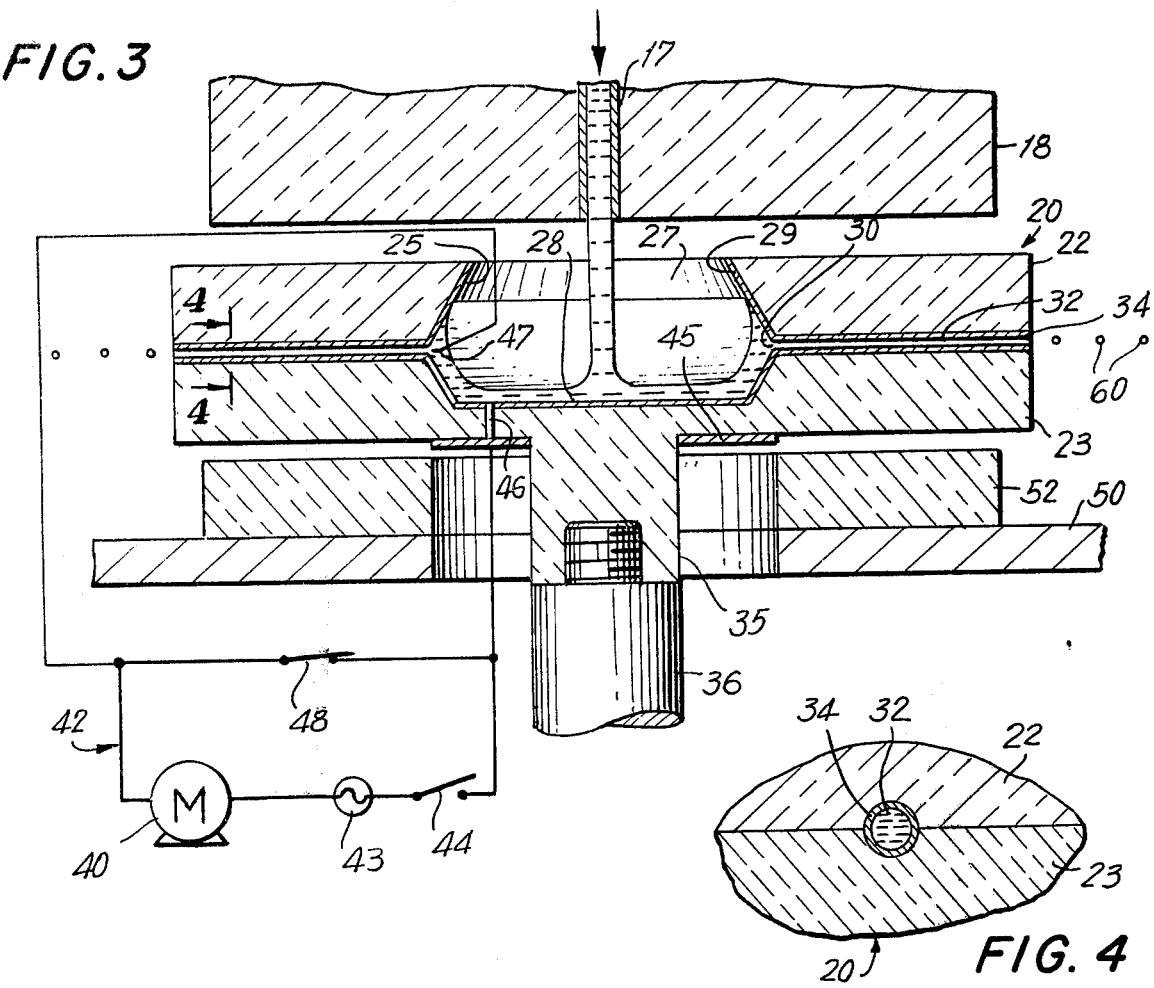
FIG. 3
FIG. 4
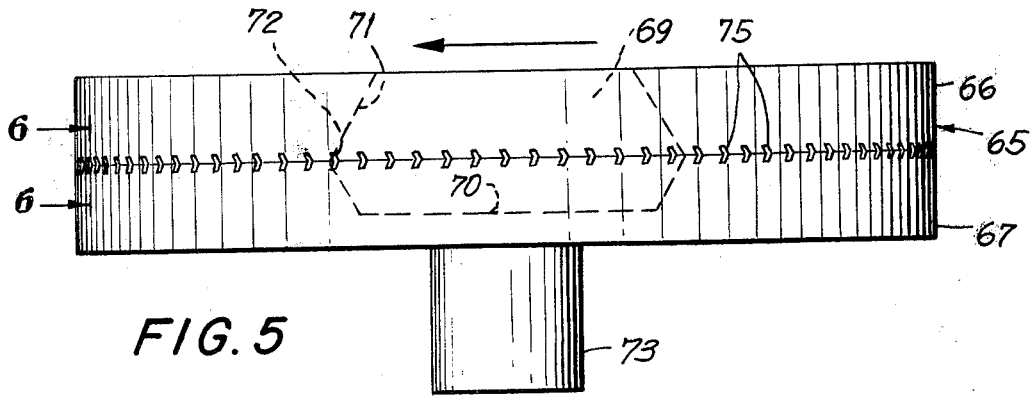
FIG. 5
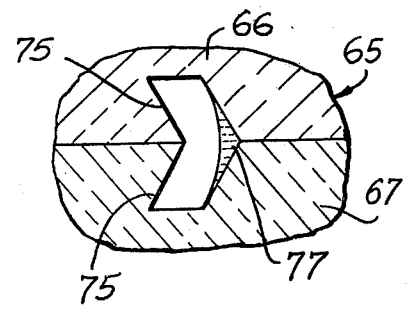
FIG. 6

APPARATUS FOR PRODUCING GLASS SPHERES

BACKGROUND OF THE INVENTION

This invention relates to the manufacture of small-diameter spheres and more particularly to an apparatus for producing such spheres from a molten stream.

The present invention, while of general application, is particularly well suited for use in the manufacture of glass beads. As is well known, beads of this type have many industrial and commercial applications. One of their primary uses is to provide a reflecting surface, such as on highway signs, motion picture screens, advertising signs, etc., or as fillers for thermoplastic and thermosetting resins.

Various apparatus and methods have been employed heretofore in the formation of glass spheres. Thus, in some cases the glass was manufactured and upon cooling was crushed to form minute particles. These particles were introduced into the vertical stack of a furnace in a manner such that the particles softened while in suspension in a heated gaseous medium and were shaped by surface tension into a substantially spherical configuration. For a more detailed discussion of representative apparatus and methods of this type, reference may be had, for example, to U.S. Pat. 2,945,326 granted July 19, 1960 to Thomas K. Wood.

Primarily because of the high cost and inefficiency resulting from the necessity for manufacturing and crushing the glass before it could be reheated to form glass spheres, attempts have been made through the years to produce the spheres by the dispersion of molten glass. These attempts in many instances involved the direction of a blast of high velocity gas transversely against a vertically flowing stream of molten glass to disperse the glass into a multiplicity of particles. The gas carried the particles through space for a distancee sufficient to enable surface tension to cause them to assume a generally spherical shape. In other cases the molten glass stream was dispersed by a continuously rotating wheel or chopper which similarly directed the dispersed particles through space to enable surface tension to shape the particles into spherical form.

The prior apparatus and methods employed in the manufacture of glass spheres and other discrete particles have exhibited several disadvantages. As an illustration, it heretofore has been difficult to maintain the molten particles at the required temperature during the formation of the spheres, and extensive heating apparatus often was required to insure that all of the spheres were maintained at the requisite temperature. In addition, and this has been of special moment in prior apparatus and methods involving the dispersion of molten glass, difficulties frequently were encountered in producing uniformly spherical particles while avoiding the formation of glass fibers. Furthermore, it often has been difficult heretofore to accurately control the size of the dispersed particles prior to the setting thereof to form spheres.

SUMMARY

One general object of this invention, therefore, is to provide a novel and economical apparatus for making glass spheres or other spherical particles.

More specifically, it is an object of this invention to provide an apparatus of the character indicated in which the formation of glass fibers is greatly reduced.

Another object of this invention is to provide such apparatus wherein the necessity for extensive heating equipment for the glass particles is substantially eliminated.

Still another object of the invention is to provide an apparatus for making glass spheres of more uniform size.

A further object of the invention is to provide a new and improved apparatus for making glass spheres which is economical and thoroughly reliable in operation.

In one illustrative embodiment of the invention, molten glass is discharged from a glass tank or other suitable source in a free flowing stream. The glass passes through a discharge tube, preferably of platinum or other heat and corrosion resistant material, which is surrounded by a heating jacket to maintain the stream at an elevated temperature. The molten stream is received by an open-top rotary receptacle. This receptacle includes an inner material-receiving surface extending in a plane perpendicular to the molten stream in close juxtaposition with the discharge tube and an upstanding side wall around the surface. A series of capillary orifices extend radially in a single plane from entrance openings in the side wall. As the receptacle is rotated, the molten material passes through the orifices and is discharged therefrom to form a multiplicity of dispersed particles. The particles pass through a space for a period of time sufficient to enable surface tension to shape them into spherical form, and the resulting spheres are collected in solid form at the end of their trajectory.

In accordance with one feature of the invention, in certain particularly important embodiments, the molten material is discharged into the receptacle at a rate sufficient to maintain the material in continuous contact with at least a major portion of the upstanding side wall to completely cover the entrance openings of the orifices. The arrangement is such that there is a continuous heat-conductive path of molten material from the supply tank through the free falling stream and the receptacle to the orifices, with the result that the material is maintained at a sufficiently elevated temperature as it passes through the orifice to produce spheres of extremely high quality.

In accordance with another feature of the invention, in certain good arrangements, the molten material is discharged from the capillary orifices under ambient temperature conditions. The discharged particles are thus subjected to rapid cooling as they leave the receptacle, and the particles spherodize and are quickly solidified to retain their spherical shape.

In accordance with a further feature of the invention, in several advantageous embodiments, each of the capillary orifices has a cross-sectional area which is substantially equal to that of the spheres to be produced. With this arrangement, a minimum of sorting is required, and the uniformity of the spheres is increased.

In accordance with still another feature of certain embodiments of the invention, the upstanding side wall on the receptacle defines a shallow V-shaped groove around the material-receiving surface, and the capillary orifices extend radially from the apex of this groove. Because of the rotation of the receptacle, the groove is filled with the molten material at all times with the result that the possibility of bubbles or other imperfections being introduced in the spheres is substantially reduced.

In accordance with a still further feature of the invention, in some embodiments, the collecting means for the spheres comprises a series of open-top cylindrical bins which are concentric with the rotational axis of the receptacle. The bins are supported by a rotatable table and greatly facilitate the collection of the spheres following their manufacture.

The present invention, as well as further objects and features thereof, will be more fully understood from the following description of certain preferred embodiments, when read with reference to the accompanying drawings.

BRIEF DESCRIPTION OF THE DRAWINGS

FIG. 3 is an enlarged transverse vertical sectional view of the receptacle portion of the apparatus, together with certain cooperating parts and a schematic representation of the electrical circuit.

FIG. 4 is a fragmentary sectional view taken along the line 4—4 in FIG. 3.

FIG. 5 is a side elevational view similar to a portion of FIG. 3 but showing apparatus for making small-diameter glass spheres in accordance with another illustrative embodiment of the invention.

FIG. 6 is a fragmentary sectional view taken along the line 6—6 in FIG. 5.

DESCRIPTION OF CERTAIN PREFERRED EMBODIMENTS

Figure 1:
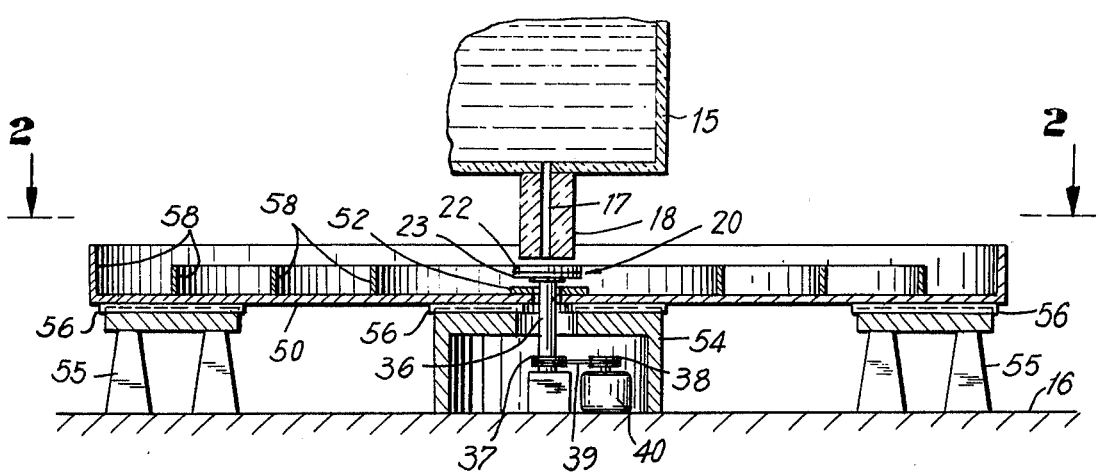
FIG. 1 is a diagrammatic vertical sectional view of apparatus for making small-diameter glass spheres in accordance with one illustrative embodiment of the invention.
Figure 2:
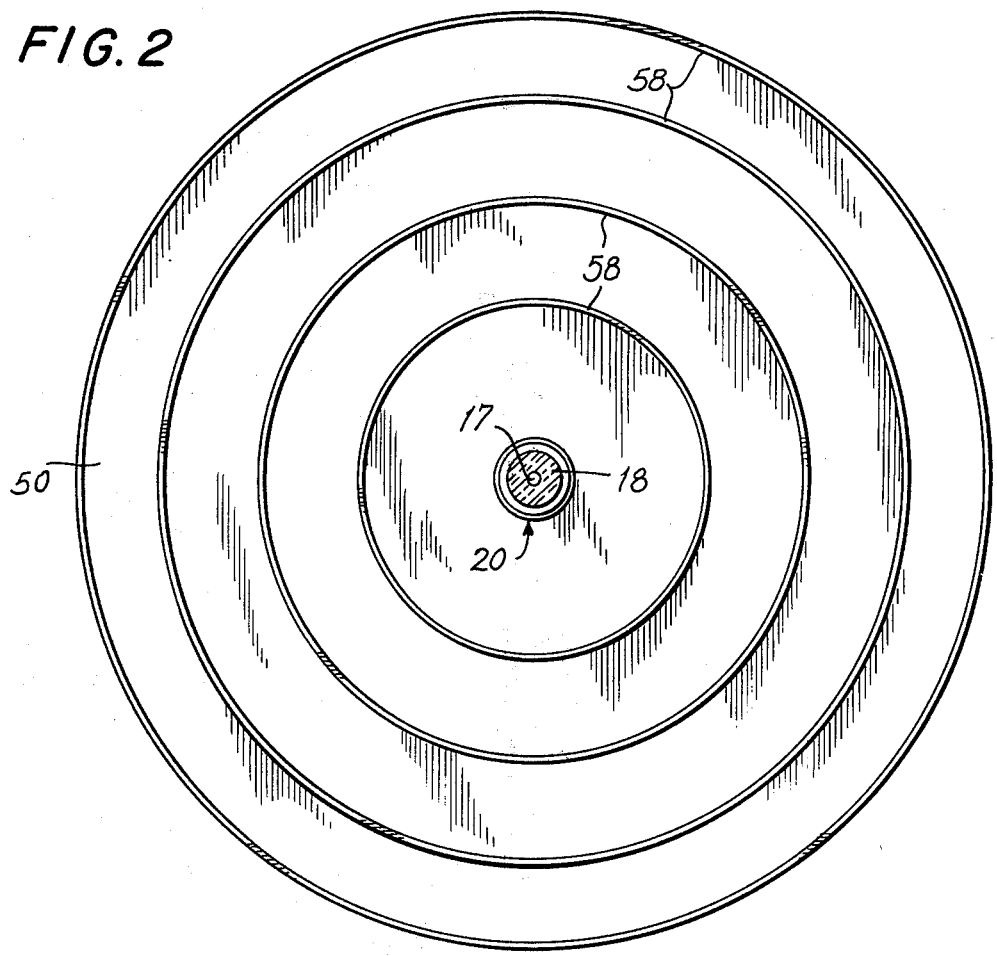
FIG. 2 is a horizontal sectional view taken along the line 2—2 in FIG. 1.
Figure 7:
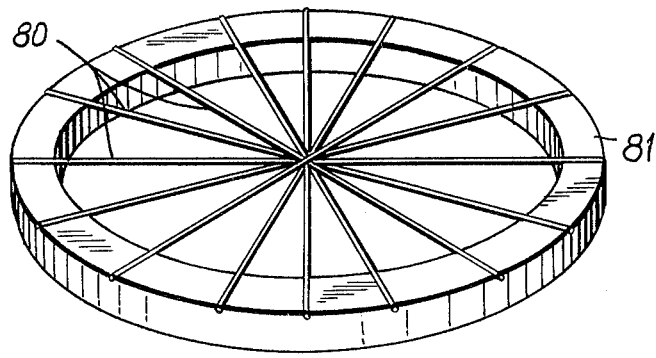
FIGS. 7 – 11 are schematic illustrations of the successive steps utilized in fabricating the receptacle portion of the apparatus shown in FIGS. 1 – 4.

Referring to FIG. 1 of the drawings, there is shown a ceramic glass furnace 15 which is suitably supported above the floor 16. The furnace 15 contains a supply of molten glass or other sphere-forming material and is at an elevated temperature to maintain the material in a fluid condition under controlled viscosity. Extending downwardly from the lowermost portion of the furnace 15 is a discharge tube 17 which advantageously is fabricated from platinum or other corrosion and heat resistant material. A heating jacket 18 surrounds the tube 17 to maintain it at an elevated temperature. This jacket is of conventional construction and is supplied with sufficient heat to hold the material within the tube at a temperature at least equal to and preferably greater than the temperature of the material within the furnace.

An open-top rotary receptacle 20 is located in close juxtaposition with the lower end of the discharge tube 17. As best shown in FIG. 3, the receptacle 20 includes a pair of ceramic discs 22 and 23 in facing relationship with each other which serve to support an inner structure or lining 25. The lining 25 preferably is of platinum, gold, nickel or similar material and is fabricated in a manner that will become more fully apparent hereinafter.

The receptacle 20 defines a centrally located cavity 27 which is formed by an inner material-receiving surface 28 and an upstanding cylindrical side wall 29. The surface 28 extends horizontally in a plane perpendicular to the discharge tube 17 and is arranged in close proximity with the lower end of the tube. The side wall 29 is located around the periphery of the surface 28 and is shaped to provide a shallow V-shaped groove 30 of circular configuration.

A multiplicity of capillary orifices 32 extend radially from the apex of the V-shaped groove 30 to the exterior of the receptacle 20. The orifices 32 are equally spaced about the rotational axis of the receptacle 20 and are arrayed in a single horizontal plane between the ceramic discs 22 and 23 in spaced relationship with the material-receiving surface 28. As best illustrated in FIG. 4, each of the orifices 32 is of circular cross-section and is located within a radial spoke 34 which forms a part of the lining 25. Although the orifice has been shown greatly enlarged in FIG. 4 for clarity of illustration, its cross-sectional area advantageously is substantially equal to that of the spheres to be produced. The length of each orifice should be greater than its diameter by at least a factor of twenty for best results. In the illustrative embodiment of FIGS. 1 – 4 the receptacle is provided with one hundred such orifices.

Protruding downwardly from the lower ceramic disc 23 is an integrally formed bushing 35. The bushing 35 is suitably affixed to an upstanding drive shaft 36 which is connected by pulleys 37 and 38 (FIG. 1) and a belt 39 to a synchronous motor 40. The motor 40 is supported on the floor 16 and is arranged to rotate the receptacle 20 at a constant speed.

The motor 40 operates under the control of an electrical circuit shown schematically at 42. This circuit includes a suitable source 43 of alternating current connected between one of the motor terminals and a normally open start switch 44. The switch 44 is connected to a brush and commutator assembly 45 on the ceramic disc 23 and from the assembly 45 to a conductor 46 leading to the platinum lining 25 on the interior of the receptacle 20. The other terminal of the motor is in electrically conductive relationship with a platinum wire 47 in spaced juxtaposition with the V-shaped groove 30 in the receptacle side wall 29. A normally closed switch 48 is connected across the motor 40 in parallel with the source 43 and the switch 44.

Disposed about the receptacle shaft 36 is a rotatable circular table 50. The table 50 is arranged in concentric relationship with the rotational axis of the receptacle 20 and supports a resistance heating element 52 immediately beneath the receptacle. The element 52 serves to maintain the receptacle 20 at an elevated temperature.

As best shown in FIG. 1, the rotatable table 50 is supported by a centrally located table 54 and a plurality of additional tables 55 located adjacent the periphery of the table 50. The tables 54 and 55 carry rollers 56 which extend in radial directions and bear against the lower surface of the table 50 to facilitate its rotation.

A series of open-top cylindrical bins 58 are mounted in spaced relationship with each other on the rotatable table 50. These bins are concentric with the rotational axis of the receptacle 20 and are located at progressively increasing distances from the axis in position to receive material from the receptacle. The arrangement is such that, upon the manual rotation of the table 50, the bins 58 likewise rotate as a unit about the receptacle axis.

The glass or other sphere-forming material within the furnace 15 is heated to a temperature sufficient to produce a free falling molten stream of relatively low viscosity, when compared with the viscosity of glass in conventional glass manufacturing techniques. The heat from the furnace 15, as supplemented by that from the heating jacket 18 and the heating element 52, should be such that the temperature of the molten glass is at least about 350°C. at the point at which the stream contacts the receiving surface 28 of the receptacle 20. The viscosity of the heated glass for many applications should lie within a range of from about 200 poises down to about 1 poise or even lower. If the viscosity exceeds about 200 poises, the glass exhibits a tendency to string out and form fibers rather than spheres.

To initiate the rotation of the receptacle 20, the start switch 44 (FIG. 3) is closed to complete the circuit for the motor 40 through the normally closed switch 48. The motor 40 drives the receptacle 20 at a uniform constant speed, illustratively 2,000 revolutions per minute, which is sufficient to cause the molten material within the cavity 27 to move by centrifugal force against the upstanding side wall 29. As will become more fully apparent hereinafter, the rotational speed of the receptacle, together with the flow rate of the molten stream, are such that the molten material is maintained in continuous contact with at least a major portion of the side wall 29 and fills the V-shaped groove 30 to completely cover the entrance openings for the orifices 30. The material surrounds the contact wire 47 and exhibits sufficient electrical conductivity to complete a circuit between the wire 47 and the lining 25 leading to the conductor 46. The normally closed switch 48 is then opened to place the motor 40 in series with the conductor 46 and the wire 47. In the event the flow rate of the molten material drops below that needed to cause the material to completely cover the entrance openings, the circuit is broken between the conductor 46 and the wire 47 to automatically shut down the motor and arrest the sphere producing operation.

The molten material within the receptacle 20 passes through each of the capillary orifices 32 and is discharged therefrom into the atmosphere to form a multiplicity of dispersed particles 60. The length of each of the orifices 32 is substantially greater than its diameter and advantageously lies within the range of from about 5 millimeters to about 20 millimeters. The diameter of each orifice, on the other hand, corresponds with that of the spheres to be produced and illustratively is from about 0.125 inch down to about 25 microns. With this arrangement, the particles 60 emerging from the receptacle are initially in the shape of small cylinders but rapidly become spherical because of surface tension.

As the particles 60 leave the orifices 32, they are subjected to extremely rapid cooling. The particles quickly solidify in their spherical form and proceed through space for a period of time sufficient to cause the setting thereof to form glass beads. Each of the thus formed beads is a solid sphere of uniform density with good optical characteristics and a minimum of imperfections.

The glass spheres from the receptacle 20 drop into the individual bins 58 at the end of their trajectory. Under ideal operating conditions, with constant flow rates, temperatures, viscosity, rotational speed, etc., the spheres would all be the same size and would fall into only one of the bins. Because of unavoidable variations in these parameters, however, the spheres exhibit slight gradations in size, and the larger and hence heavier spheres are projected into the outermost bins while the smaller spheres drop into the inner bins. The spheres are thus automatically graded according to size during the manufacturing operation. The packaging of the spheres may take place at a single point at the periphery of the bins through the use of the rotatable table 50. By manually moving the table the spheres within the bins may be quickly and easily advanced to the collection point.

As indicated heretofore, for best results it is important that the molten material within the receptacle 20 be maintained in continuous contact with the upstanding side wall 29 in order to completely cover the entrance openings for the capillary orifices 32 at all times. Both the rate of feed of the free falling molten stream and the rotational speed of the receptacle should be sufficient to achieve that result. The number or orifices in a particular receptacle also is important, because if there are too many orifices for a given flow rate and rotational speed the material may be withdrawn from the receptacle at too rapid a rate and thus lose its continuous contact with the orifice openings.

The following table is illustrative of successive satisfactory relationships between the number or orifices in the receptacle, the flow rate of the free falling molten stream in pounds of material per hour, and the receptacle speed in revolutions per minute, for a series of experimental runs in accordance with the invention:

TABLE

| Run | No. of Orifices | Flow Rate (lb./Hr.) | Speed (RPM) |
|---|---|---|---|
| A | 60 | 120 | 2200 |
| B | 120 | 120 | 1100 |
| C | 60 | 240 | 4400 |
| D | 30 | 120 | 4400 |
| E | 120 | 240 | 2200 |
| F | 60 | 60 | 1100 |
| G | 240 | 120 | 550 |
| H | 240 | 480 | 2200 |
| I | 100 | 125 | 2000 |

The figures in the foregoing table are but illustrative of a wide combination of parameters that may be employed to maintain the molten material within the receptacle in continuous contact with the openings of the orifices.

The rotational speed of the receptacle 20 should be sufficient to fling the dispersed particles through a space for a distance which enables them to solidify before dropping into the bins 58. If the speed of the receptacle is too high, on the other hand, the particles may tend to elongate as they move through the space and form spheres which are not entirely round. These factors in turn are affected by the viscosity of the particular sphere-forming material being used. For the more common vitreous materials having viscosities within the range identified above, the speed of the receptacle should be maintained within the range of from about 1,000 revolutions per minute to about 5,000 revolutions per minute to provide spheres of optimum quality.

FIGS. 5 and 6 are illustrative of an alternative open-top receptacle 65 which may be employed in lieu of the receptacle 20 of FIGS. 1 – 4. The receptacle 65 is fabricated from two equal-diameter discs 66 and 67 of stainless steel, ceramic or other heat resistant material. These discs are suitably affixed in facing relationship with each other and form a central cavity 69 of a configuration similar to that of the cavity 27 described heretofore. The cavity 69 includes a horizontal material-receiving surface 70 and an upstanding side wall 71 having a V-shaped groove 72. The lowermost disc 67 is provided with a bushing 73 which is mounted on the drive shaft 36 (FIG. 3).

A series of radially extending grooves 75 is machined from each of the opposed faces of the discs 66 and 67. As best shown in FIG. 6, each groove 75 lies in a plane which meets the disc faces at an acute angle. When the discs are assembled to form the complete receptacle, the grooves are superimposed, and their planes are each angularly disposed with respect to the receptacle's rotational axis. The arrangement is such that the grooves form a multiplicity of capillary orifices 76 in the receptacle which are of chevron-shaped cross-section. The grooves forming each orifice 76 meet at a comparatively large obtuse angle which points in a direction opposite to the receptacle's direction of rotation.

The receptacle 65 is rotated at a speed sufficient to maintain the molten material within the cavity 69 in continuous contact with at least a major portion of the upstanding side wall 71 to completely cover the entrance openings of the capillary orifices 76. As illustrated at 77 in FIG. 6, the molten material moves along each orifice and is urged by centrifugal force against the trailing portion of the orifice and into the angle formed by the grooves 75. The cross-sectional area of the material within each orifice advantageously is substantially equal to that of the spheres to be produced. The material passes through the orifices and is discharged therefrom into the atmosphere under ambient temperature conditions in the manner described above. The discharge material forms a multiplicity of dispersed particles which pass through a space for a period of time sufficient to enable surface tension to shape the particles into spherical form. The spheres solidify and drop into the bins 58 (FIG. 1) where they are collected.

In order to more thoroughly disclose the nature of the present invention, the following examples illustrating the invention are given. It should be understood, however, that this is done solely by way of example and is intended neither to delineate the scope of the invention nor limit the ambit of the appended claims.

EXAMPLE I

As an example of the effectiveness of the apparatus and method of the present invention in the manufacture of glass spheres, a lead borate glass of conventional composition was heated within a suitable melting tank to a temperature of 700°C. The glass exhibited a softening point of 490°C. The molten material was discharged in a free falling stream through a discharge tube of the type shown in FIG. 1, and a heating jacket around the tube was maintained at a temperature of 760°C. the material was discharged from the tank at a rate of 125 pounds per hour.

An open-top rotary receptacle of the type illustrated in FIGS. 1 – 4 was located in close juxtaposition with the lower end of the discharge tube. The receptacle was rotated at a constant speed of 2,000 revolutions per minute, and it included 100 equally spaced radial orifices extending from adjacent the center of the receptacle to its periphery. The molten glass within the receptacle was observed to be in continuous contact with the receptacle's upstanding side wall to completely cover the entrance openings of the orifices. The material passed through the orifices and was discharged from the receptacle into the atmosphere under ambient temperature conditions to form a multiplicity of dispersed particles. Shortly after leaving the receptacle, the particles assumed a spherical form and proceeded through a space for a period of time sufficient to enable them to solidify. The spheres dropped into collecting bins at the end of their trajectory.

Representative samples of thus produced spheres were examined microscopically in accordance with standard testing techniques. They were observed to be of substantially uniform diameter which very closely approximated the diameter of the orifices in the receptacle. The spheres exhibited good roundness characteristics and were clear and free from bubbles and other imperfections.

EXAMPLE II

The procedure of Example I was repeated with a conventional barium titanate glass having an index of refraction of 1.9 and a softening point of 1,280°C. The temperature of the glass tank and the heating jacket around the discharge tube was sufficient to hold the free falling molten glass stream at a temperature of between 1300°C. and 1400°C. The receptacle included 100 radial orifices and was rotated at a speed of 2,000 revolutions per minute with a glass flow rate of 125 pounds per hour.

As with the preceding example, microscopic examination of the resulting glass spheres showed that they were of acceptable roundness and exhibited extremely good clarity and uniformity.

EXAMPLE III

The procedure of Example I was repeated with varying rotational speeds, flow rates and receptacle orifices in accordance with runs A – H identified in the foregoing table. The remaining parameters were the same. The resulting product in each case was observed to be satisfactory.

EXAMPLE IV

Successive paraffin samples having a melting point of 70°C. were heated to temperatures which ranged between 80°C. and 160°C. Each of the thus melted samples was discharged in a free falling stream into an open-top rotary receptacle of the type illustrated in FIGS. 5 and 6 at a rate of 60 pounds per hour. The receptacle had an external diameter of 120 millimeters and included 30 equally spaced radial orifices extending from adjacent the center of the receptacle to its periphery.

A number of runs were made at each temperature with the receptacle rotating at a constant speed of from 1000 revolutions per minute to 1800 revolutions per minute. The molten paraffin within the receptacle was maintained in continuous contact with the receptacle's upstanding side wall to completely cover the entrance openings of the orifices. The paraffin passed through the orifices and was discharged from the receptacle into the atmosphere under ambient temperature conditions to form a multiplicity of dispersed particles. Shortly after leaving the receptacle, the particles assumed a spherical shape and proceeded through a space for a period of time sufficient to enable them to solidify. After collecting the spheres they were examined and found to be of uniform diameter with good roundness characteristics.

EXAMPLE V

The procedure of Example III was repeated but with a tin-lead solder as the sphere forming material. The solder exhibited a melting point of 170°C. and was maintained at a temperature of 250°C. as it was discharged in a free falling molten stream. The remaining parameters were the same. As in the previous examples, the resulting spheres were observed to be satisfactory.

Referring now to FIGS. 7 – 11, there are shown diagrammatic representations of successive steps in the fabrication of the open-top receptacle 20 of FIGS. 1 – 4. A series of continuous fusible fibers 80 is stretched across one face of a support ring 81 which serves as a form for the fibers. In the illustrated embodiment the fibers 80 comprise continuous nylon filaments, although cellulose, aluminum, copper or other plastic or metal material may be employed with good results. The diameter of each of the fibers 80 is the same as that of the orifices in the receptacle, and the fibers extend diametrically in a single plane across the ring 81 with a radial orientation corresponding to that of the orifices. In some cases the face of the ring is provided with suitable grooves to facilitate holding the fibers in place.

Figure 8:
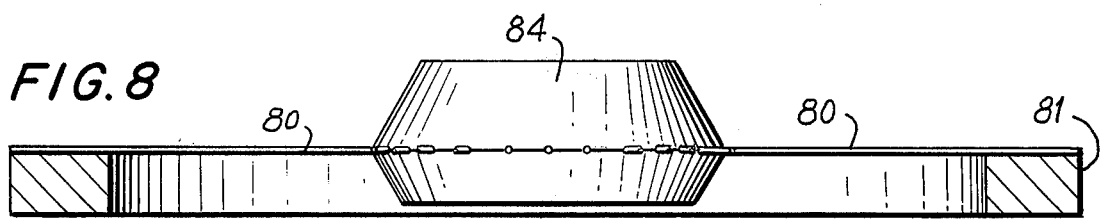
Figure 9:
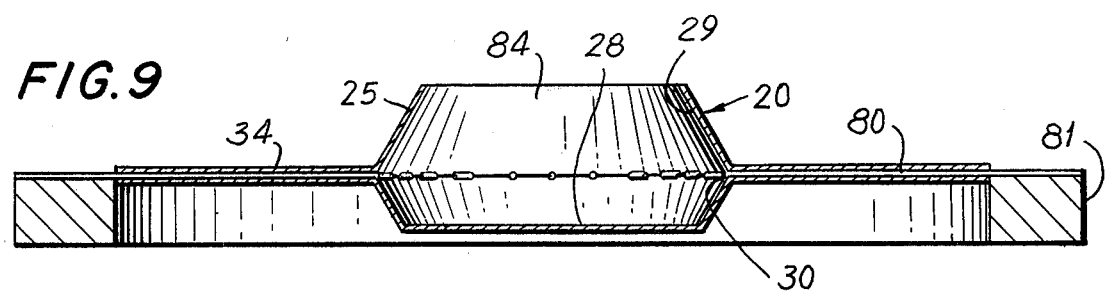
Figure 10:
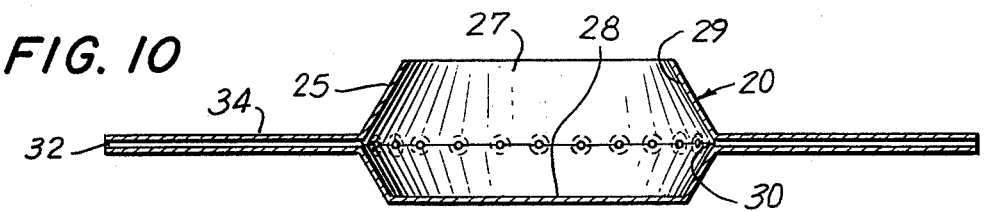
Figure 11:
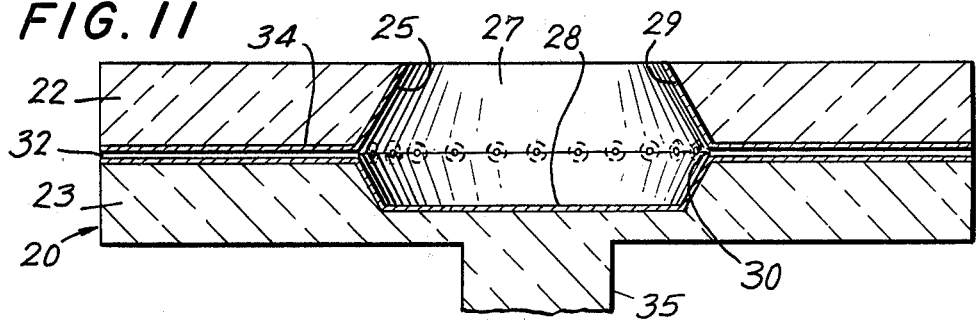

As best shown in FIG. 8, a center body 84 is formed on opposite sides of the central portion of the web-like array created by the fibers 80. The body 84 is of epoxy or other polyester resin and is of a shape which corresponds to the internal configuration of the cavity 27 (FIG. 11). The body 84 advantageously is made from two polyester discs which are oriented on opposite sides of the web of fibers and are heated slightly to fuse the discs together.

The structure comprising the center body 84 and the protruding fibers 80 is then made electrically conductibe through a suitable vacuum metalizing or chemical deposition process with silver, gold, nickel, or other metal. The lining 25 is electroplated onto the electrically conductive structure to a thickness of one or two millimeters, for example. As indicated heretofore, this lining preferably is of platinum, gold, nickel or other metal having high heat resistance. The electroplating process provides a continuous self-supporting metal coating on the exposed surfaces of the body 84 and around each of the fibers 80. The upper surface of the body is left uncoated to form the opening for the receptacle.

Following the formation of the lining 25, the center body 84 is dissolved away, and the ring 81 is removed. The assembly is then heated to a temperature sufficient to burn away the plastic or metal fibers 80, leaving the receptacle structure illustrated in FIG. 10. This structure includes the material-receiving surface 28, the upstanding side wall 29, the V-shaped groove 30 and the capillary orifices 32 within the radial spokes 34.

The completed assembly is thereupon encased in the ceramic discs 22 and 23 (FIG. 11) to provide added structural rigidity. The thus produced receptacle is mounted on the drive shaft 36 (FIG. 3) and is continuously rotated to manufacture glass beads or other spherical particles in the manner described heretofore.

The fabrication of the receptacle 20 by the process of FIGS. 7 – 11 is of particular utility in cases in which the diameter of the spheres to be produced, and hence the diameter of the capillary orifices 32, is within the range of from about 30 microns to about 130 microns. The fibers 80 are not commercially available in sizes below 30 microns at the present time, and for spheres of smaller diameter the receptacle is made by other techniques. For orifices having a diameter much above 130 microns, it is generally more economical to machine them, in the manner illustrated in FIGS. 5 and 6, for example, rather than to use the process of FIGS. 7 – 11.

Although the invention has been illustrated and described with particular reference to the manufacture of glass spheres, in many respects it is also applicable to the production of spheres from thermoplastic or other sphere-forming materials. Various additional uses for the invention will suggest themselves to those skilled in the art upon a perusal of the foregoing disclosure.

The terms and expressions which have been employed are used as terms of description and not of limitation, and there is no intention, in the use of such terms and expressions, of excluding any equivalents of the features shown and described, or portions thereof, it being recognized that various modifications are possible within the spirit and scope of the invention.

I claim:

1. Apparatus for producing spherical particles comprising, in combination:

means for supplying molten sphere-forming material;

conduit means including a discharge tube communicating with the supply means for providing a free falling molten stream of the material;

an open-top rotary receptacle for receiving the molten stream from the conduit means, the receptacle including an inner material-receiving surface extending in a plane perpendicular to the molten stream in close juxtaposition with the conduit means, an upstanding side wall around the material-receiving surface, an exterior cylindrical surface at least equal in height to the upstanding side wall, and a multiplicity of capillary orifices extending radially in a single plane from the side wall to the exterior cylindrical surface of the receptacle, each of the orifices having a cross-sectional area which is substantially equal to that of the spheres to be produced;

means for rotating the receptacle at a speed sufficient to maintain the molten material in continuous contact with at least a portion of the upstanding side wall, the molten material passing through the orifices and being discharged therefrom into the atmosphere under ambient temperature conditions to form a multiplicity of dispersed particles, the discharged particles passing through a space for a period of time sufficient to enable surface tension to shape the particles into spherical form; and means for collecting the spheres in solid form at the end of their trajectory, the collecting means including a series of open-top cylindrical bins concentric with the rotational axis of the receptacle for receiving said spheres.

2. Apparatus for producing spherical particles comprising, in combination:
  means for supplying molten sphere-forming material;
  conduit means including a discharge tube communicating with the supply means for providing a free falling molten stream of the material;
  an open-top rotary receptacle for receiving the molten stream from the conduit means, the receptacle including an inner material-receiving surface extending in a plane perpendicular to the molten stream in close juxtaposition with the conduit means, an upstanding side wall around the material-receiving surface, an exterior cylindrical surface at least equal in height to the upstanding side wall, and a multiplicity of capillary orifices extending radially in a single plane from the side wall to the exterior cylindrical surface of the receptacle, each of the orifices having a cross-sectional area which is substantially equal to that of the spheres to be produced;
  means for rotating the receptacle at a speed sufficient to maintain the molten material in continuous contact with at least a portion of the upstanding side wall, the molten material passing through the orifices and being discharged therefrom into the atmosphere under ambient temperature conditions to form a multiplicity of dispersed particles, the discharged particles passing through a space for a period of time sufficient to enable surface tension to shape the particles into spherical form;
  means for collecting the spheres in solid form at the end of their trajectory, the collecting means including a series of open-top cylindrical bins concentric with the rotational axis of the receptacle for receiving said spheres;
  a rotatable table for supporting said bins; and
  means for rotating the table about an axis concentric with the rotational axis of the receptacle.

* * * * *